United States Patent Office 3,312,660
Patented Apr. 4, 1967

3,312,660
PROCESS FOR PREPARING POLYCARBONATES BY SELF-CONDENSATION OF BISPHENOL DICHLOROFORMATE
Raymond P. Kurkjy, Geneva, Switzerland, and Markus Matzner, Edison Township, and Robert J. Cotter, New Brunswick, N.J., assignors to Union Carbide Corporation, a corporation of New York
No Drawing. Filed July 3, 1962, Ser. No. 208,671
13 Claims. (Cl. 260—47)

The present invention relates in general to a novel process for preparing polycarbonate resins, and more particularly to an anhydrous process for preparing polycarbonates from aryl dichloroformates using metal salt reagents.

It has formerly been proposed to prepare polycarbonates by several techniques, most if not all of which can be categorized as being either ester interchange or direct phosgenation. According to the ester-interchange method a suitable diester of carbonic acid is contacted with a dihydric phenol at elevated temperatures sufficient to promote a condensation reaction and thereby form a polycarbonate chain. The direct phosgenation method comprises an inter-facial reaction between phosgene and an alkali metal salt of a dihydric phenol in a two-phase reaction system having an inert organic solvent medium for one phase and an aqueous medium for the other phase.

Each of the above-mentioned general processes has one or more disadvantages which would be desirably avoided, particularly where large scale commercial operations are involved. For example in the later polymerization stages of the ester-exchange process, the reaction system becomes extremely viscous, thereby giving rise to problems of agitation or stirring and to problems associated with the removal from the reaction system of the reaction by-products. Also, because of the relatively high reaction temperatures involved, some molecular rearrangement is incurred which to some degree destroys the complete linearity of the polycarbonate product.

By the interfacial direct phosgenation method it has been found that a few but quite interesting dihydric phenols are polymerized to form polycarbonates only with considerable difficulty. Moreover, because of the strongly alkaline nature of the reaction system, chain cleavage of some polymer chains already formed occurs, rendering reproducibility difficult to obtain without particular effort being made to control the pH of the reaction system.

It is therefore the general object of the present invention to provide a novel anhydrous process for preparing polycarbonate resins which avoids the disadvantages of the prior known methods.

It is a more particular object of the present invention to provide a process for preparing polycarbonates in excellent yield, good color, and reproducibly high molecular weight.

These and other and more particular objects which will be obvious from the specification hereinafter are accomplished by the process of the present invention which comprises heating at elevated temperatures an anhydrous reaction system comprising a bisphenol dichloroformate and a sulfite, carbonate, bisulfite, or bicarbonate of a metal of Groups I-A, II-A, and II-B of the Deming periodic classification of elements.

The aryl dichloroformates suitably employed in the process of this invention have the general formula (I)

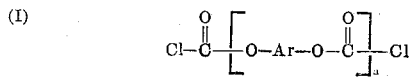

wherein $n$ is an integer having a value of from 1 to about 15, and Ar represents ahe aromatic hydrocarbon residue of a dihydric phenol, i.e. the divalent moiety which remains after schematically splitting off both hydroxyl groups from the dihydric phenol free of groups reactive in the system herein employed such as amine and carboxyl, and sulfhydryl.

The dichloroformate of any of the dihydric phenols heretofore employed in any of the prior known polycarbonate processes are suitable for use in this invention. Such dichloroformates are usually defined as being mononuclear or polynuclear compounds in which the two

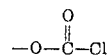

groups are directly attached to different carbon atoms of the same or different aromatic nuclei. The class of suitable aryl dichloroformates is quite large and includes the dichloroformate derivatives of the phenol compounds described in U.S. Patent 2,950,266—Goldblum and U.S. Patent 2,964,797—Peilstöcker et al. corresponding to the general formula (II)

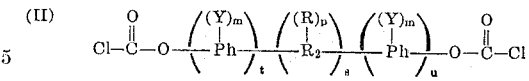

wherein the radical

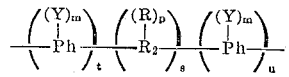

is equivalent of —Ar— in Formula I above wherein R is hydrogen or a monovalent hydrocarbon radical, for example, alkyl radicals (e.g., methyl, ethyl, propyl, isopropyl, butyl, decyl, etc.), aryl radicals (e.g. phenyl, naphthyl, biphenyl, tolyl, xylyl, etc.), aralkyl radicals (e.g. benzyl, ethylphenyl, etc.), cycloaliphatic radicals (e.g. cyclopentyl, cyclohexyl, etc.) as well as monovalent hydrocarbon radicals containing inert substituents therein, such as halogen (chlorine, bromine, fluorine, etc.). It will be understood that where more than one R is used, they may be the same or different. $R_2$ can also be a silane radical or can be a polyoxy such as polyethoxy, polypropoxy, polythioethoxy, polybutoxy, polyphenylethoxy or polyorganosiloxy, for example, polydimethylsiloxy, polydiphenylsiloxy, polymethylphenyl siloxy, etc., or and ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. Ph is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole number including zero. When $s$ is zero, however, either $t$ and $u$ may be zero and not both.

In the dichloroformate compound, the substituent Y may be the same or different, as may be the R. Among the substituents represented by Y are halogen (e.g.

chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where $s$ is zero in Formula II, the aromatic nuclei are directly joined with no intervening alkylene or alkylidene or other bridge. The positions of the hydroxyl groups and Y on the aromatic nuclear residues Ph can be varied in the ortho, meta, or para positions and the groups can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis (4-hydroxyphenyl)-propane (Bisphenol-A);
2,4'-dihydroxydiphenyl-methane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl) propane;
2,2-bis-(4-hydroxyphenyl)-1-phenyl propane;

and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones such as bis - (p - hydroxyphenyl)-sulfone; 2,4'-dihydroxydiphenyl sulfone; 5'-chloro-2,4'-dihydroxydiphenyl sulfone; 5'-chloro-2'-4-dihydroxydiphenyl sulfone; 5'-chloro-2'-4-dihydroxyphenyl sulfone; 3'-chloro-4,4'-dihydroxydiphenyl sulfone; bis (4-hydroxy phenyl) biphenyl disulfone, etc. The preparation of these and other useful sulfones is described in Patent 2,288,282—Huissman. Polysulfones as well as substituted sulfones using halogen, nitrogen, alkyl radicals, etc. are also useful. Dihydroxy aromatic ethers such as p,p'-dihydroxydiphenyl ether; the 4,3'-, 4,2'-, 3,3'-, 2,2'-, 2,3'- etc. dihydroxydiphenyl ethers;

4,4'-dihydroxy-2,6-dimethyldiphenyl ether;
4,4'-dihydroxy-2,5-dimethyldiphenyl ether;
4,4'-dihydroxy-3,3'-di-isobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the aforesaid aryl dichloroformates can be used, and where $n$ in Formula I above is greater than 1, the Ar moiety need not be the same in each repeating unit. Preferably the dichloroformates are those wherein Ar is the divalent residue of the gem-bis-(hydroxyphenyl) alkane in which the central alkylidene radical contains from 1 to 6 carbon atoms. Most particularly preferred is 2,2-bis(4-hydroxyphenyl)propane dichloroformate.

The aryl dichloroformates represented by Formula II above can readily be prepared by phosgenation of the corresponding dihydric phenols according to the method described in detail in our copending application Ser. No. 208,673 filed on the same date as the present application and since issued as U.S.P. 3,255,230.

Those aryl dichloroformates corresponding to Formula I wherein $n$ has a value of 2 or greater can be prepared by rapidly adding, preferably as a liquid, phosgene to an aqueous solution of the dialkali metal salt of a dihydric phenol which contains a buffer such as sodium carbonate to establish a reaction system having a pH of not more than 12 and preferably from 9–11. The reaction system can also contain an inert organic diluent such as methylene chloride. Exemplary of this procedure is the disclosure of British Patent 878,115, published Sept. 27, 1961.

The metal salts which are reacted with aryl dichloroformates described above in accordance with the present process are those in which the cation is a metal ion in its highest valence state selected from Groups I–A, II–A, and II–B of the Deming Periodic System of Elements [Handbook of Chemistry and Physics, page 312, 30th ed. (1947), Chemical Rubber Publishing Co., Cleveland, Ohio] and the anion is a membed selected from the group consisting of $CO_3^{--}$, $HCO_3^-$, $SO_3^{--}$, and $HSO_3^-$.

The metals of these groups, in the form of the carbonate, bicarbonate (acid carbonate), bisulfite, or sulfite, which are of the greatest practical interest because of their ready availability and relatively low cost are lithium, sodium, potassium, rubidium, cesium, beryllium, magnesium, calcium, strontium, barium, zinc, cadmium, and mercury. Preferred compounds are the alkali and alkaline earth metal carbonates and the alkali metal bicarbonates, sulfites, and bisulfites. The alkali metals are those of Group I–A of the Deming periodic table and alkaline earth metals are classified as Group II–A elements. Especially preferred species are magnesium carbonate, sodium carbonate, and sodium bicarbonate.

Specifically illustrative of the metal salts suitably employed as reagents in the present process are lithium bicarbonate, sodium carbonate, sodium sulfite, potassium carbonate, rubidium bicarbonate, cesium sulfite, magnesium carbonate, magnesium sulfite, strontium carbonate, barium carbonate, zinc sulfite, cadmium carbonate, mercury carbonate, sodium bisulfite, magnesium bisulfite, and barium bisulfite.

The proportion of metal salt relative to the aryl dichloroformate in the reaction mixture is not a narrowly critical factor.

For a theoretically complete reaction the stoichiometric quantity of metal carbonate is one mole for each mole aryl dichloroformate present. The same stoichiometry is applicable in the case of Group I–A, II–A, and II–B metal carbonates and sulfites, and Group II–A and II–B bicarbonates and bisulfites. For Group I–A bicarbonate and bisulfites, however, 2 moles of metal salt are necessary for complete reaction with one mole of aryl dichloroformate. It will be obvious to those skilled in the art, however, that even large excesses of either the metal salt or aryl dichloroformate present in the reaction mixture will not destroy the fundamental process reaction.

The reaction can be accomplished either in bulk, preferably with the aryl dichloroformate in the molten state, or in an inert organic solvent medium. Suitable solvents serving as reaction media advantageously are the higher, boiling halogenated hydrocarbons such as chlorobenzene, dichlorobenzene, sym. tetrachloroethane, carbon tetrachloride, but other conventional solvents such as benzene, toluene, xylenes and the like can also be used.

Reaction temperatures are not critical, but optimum temperatures will vary depending primarily upon the particular aryl dichloroformate employed. In bulk reaction systems, temperatures within range of from about 90° C. to about 250° C. have been found to be generally suitable. In reactions carried out under reflux conditions using an inert organic solvent medium, the boiling temperature of the solvent is determinative of the reaction temperature at atmospheric pressure. Solvents boiling to about 60° C. to about 250° C. are preferred.

By employing mixtures of aryl dichloroformates, copolymers are prepared with equal facility as the homopolymers.

Although the reaction between the metal salt and the aryl dichloroformate proceeds without benefit of a catalyst, substantially greater polymer yields are in general obtained by adding to the reaction system a tertiary nitrogen base which serves as a catalyst for the reaction. It has been found that even trace amounts of conventional nitrogen bases as pyridine; 2-methyl pyridine, 2,6-dimethyl pyridine; quinoline; isoquinoline; 4-methylquinaldine; tetrachlorine; 2-phenylquinoline; 7-nitroquinoline; benzyldimethylamine; tributylamine; tripentylamine; N,N'-dipropylpiperazine; N,N'-dimethylhomopiperazine; N-phenylpiperidine; N-methylpiperidine; triphenylamine; and 2,6-dichloropyridine are quite effective catalysts. Pyridine is preferred. By trace amount is meant a quantity of organic tertiary base of as little as 0.0001 mole of chloroformate present. Greater amounts of as much as 0.10 mole per mole of chloroformate can be employed, but no significant increase in catalytic effect is achieved.

The present invention is more fully illustrated by the following examples. It is to be understood that these examples are in no way intended to be limitative of the proper scope of the invention which is defined in the appended claims.

EXAMPLE 1

*Preparation of the dichloroformate of 2,2-bis-(4-hydroxyphenyl)propane*

In a glass reactor equipped with stirring means and a condenser system permitting the egress of HCl only from the reactor, a solution of 20 grams (0.1 mole) of 2,2-bis-(4-hydroxyphenyl)propane, 0.05 mole distearyldimethylammonium chloride, and 250 ml. carbon tetrachloride is admixed with 19.8 grams phosgene at 0° C. The resulting mixture is then heated with stirring at such a rate as to maintain a steady reflux of phosgene. The reaction is maintained for a period of about 4 hours at a temperature of 76° C. At the end of this period, the evolution of HCl will have essentially ceased. The product dichloroformate is isolated by filtration of the cooled reaction product followed by evaporation of the resulting filtrate. The product has a melting point of 90–91° C.

EXAMPLE 2

To a glass reactor equipped with stirring means, thermometer, and reflux condenser is charged 0.32 mole of the dichloroformate of 2,2-bis(4-hydroxyphenyl)propane, 25 ml. o-dichlorobenzene, 3.3 grams (0.32 mole) sodium bisulfite, and a trace amount of pyridine (about 1 drop). The reaction mixture is heated slightly (~80° C.) for the first few minutes and thereafter more strongly at temperatures of about 175–180° C. for a period of about 15 hours. After cooling, the reaction mass is diluted with methylene chloride and filtered through a celite bed prepared in chlorobenzene. The polycarbonate product is isolated by coagulation with isopropanol followed by filtration. The polymer is normally solid and has a reduced viscosity value (0.2 gm. polymer/100 ml. methylene chloride at 25° C.) of about 0.55.

EXAMPLE 3

Using substantially the same apparatus and procedure as set forth in Example 2 a copolymer corresponding to the structure

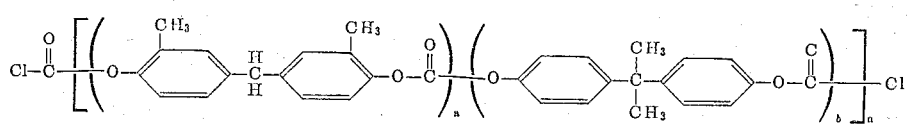

in which $a/(a+b)$ has a value of about 0.5 is prepared by heating at reflux temperature 1 mole of a substantially equimolar mixture of the dichloroformate of 2,2-bis(4-hydroxyphenyl)propane and the dichloroformate of 2,2-bis(3-methyl-4-hydroxyphenyl)methane with 1 mole magnesium carbonate.

EXAMPLE 4

(A) An aryl dichloroformate having an average structure corresponding to

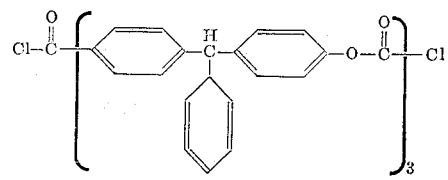

is prepared by charging to a glass reactor equipped with a stirrer 1.2 moles sodium hydroxide, 0.6 mole 2,2-bis(4-hydroxyphenyl)-phenylmethane, 0.9 mole sodium carbonate, 1000 ml. H$_2$O, and 500 ml. methylene chloride. The resulting mixture is cooled to 0° C. and maintained at this temperature, a solution of 1.25 moles phosgene in 100 ml. methylene chloride is added over a period of five minutes. The reaction mixture is stirred while the temperature is permitted to increase slowly to 25° C. The reaction medium is washed with dilute sulphuric acid, the organic layer removed, and dried over magnesium sulfate. After complete removal of residual sulfuric acid the resulting solution is evaporated, the chloroformate terminated pre-polymer dissolved in 500 ml. chlorobenzene, and the solution is thereafter contacted with approximately twice the molar quantity of sodium bicarbonate and refluxed for 24 hours. The resulting polymer product having a reduced viscosity value (0.2 gm. polymer/100 ml. CH$_2$Cl$_2$ solution at 25° C.) of greater than about 0.5.

(B) A high molecular weight polymer substantially the same as prepared in part (A) above is produced when the same prepolymer is contacted with potassium sulfite in the proportions and according to the procedure of part (A).

EXAMPLES 5–9

Using substantially the same apparatus and procedure as set forth in Example 2, a variety of polycarbonate homopolymers are produced using a variety of metal salts and solvent media. The reaction formulations are set forth in Table I below. In all examples equimolar amounts of metal salt and dichloroformate are employed.

TABLE I

| Ex. No. | $Ar\left(-O-\overset{O}{\underset{\|}{C}}-Cl\right)_2$ in which Ar is: | Metal Salt | Solvent | Polymer Product | Reaction Temp., °C. |
|---|---|---|---|---|---|
| 5 | [phenyl-SO₂-phenyl] | ZnSO₃ | Carbon tetrachloride | Cl-C(O)-[O-phenyl-SO₂-phenyl-O-C(O)-]ₙCl, n=>60 | 76 |
| 6 | [phenyl-CH₂-phenyl] | NaCO₃ | Chlorobenzene | Cl-C(O)-[O-phenyl-CH₂-phenyl-O-C(O)-]ₙCl, n=>23 | ~130 |
| 7 | [Cl-phenyl-C(CH₃)₂-phenyl-Cl] | Cd(HSO₃)₂ | Tetrachloroethane | Cl-C(O)-[O-(Cl-phenyl)-C(CH₃)₂-(phenyl-Cl)-O-C(O)-]ₙCl, n=>40 | ~144 |
| 8 | [(C₂H₅)₂-phenyl-CH(C₆H₅)-phenyl-(C₂H₅)₂] | Ba(HCO₃)₂ | Chlorobenzene | Cl-C(O)-[O-(C₂H₅)₂-phenyl-CH(C₆H₅)-phenyl-(C₂H₅)₂-O-C(O)-]ₙCl, n=>25 | ~130 |
| 9 | [naphthyl-C(CH₃)(CH₂CH₃)-naphthyl] | SrCO₃ | Dichlorobenzene | Cl-C(O)-[O-naphthyl-C(CH₃)(CH₂CH₃)-naphthyl-O-C(O)-]ₙCl, n=>50 | ~180 |

What is claimed is:

1. The process for preparing a polycarbonate resin which comprises self-condensing at elevated temperatures of between about 60° C. to 250° C. an anhydrous mixture of a bisphenol dichloroformate in the presence of about a stoichiometric quantity of a metal salt as the sole reactive materials in the reaction, said metal salt being one in which the cation is a metal ion in its highest valence state selected from groups I–A, II–A, and II–B of the Deming Periodic System of Elements and the anion is a member selected from the group consisting of $CO_3^{--}$, $HCO_3^-$, $SO_3^{--}$, and $HSO_3^-$.

2. Process according to claim 1 wherein the bisphenol dichloroformate has the general formula

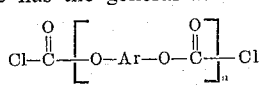

wherein $n$ has a value of from 1 to about 15 and Ar has the formula

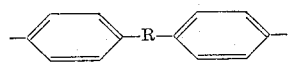

wherein R is a divalent alkylidene group and in which both phenylene groups are attached to the same carbon atom and the central alkylidene radical contains from 1 to 6 carbon atoms.

3. Process according to claim 2 wherein $n$ has a value of 1.

4. Process according to claim 2 wherein the metal salt anion is $CO_3^{--}$.

5. Process according to claim 2 wherein the metal salt anion is $HCO_3^-$.

6. Process according to claim 2 wherein the metal salt anion is $HCO_3^{--}$.

7. Process according to claim 2 wherein the metal salt anion is $HSO_3^-$.

8. Process for preparing polycarbonate resins which comprises heating at a temperature of from about 90° C. to about 250° C. the dichloroformate of a gem-bis(4-hydroxyphenyl)alkane having from 1 to 6 carbon atoms in the connective alkylidene radical of said gem-bis(4-hydroxyphenyl) alkane with a substantially equimolar quantity of magnesium carbonate.

9. Process for preparing polycarbonate resins which comprises heating at a temperature of from about 90° C. to about 250° C. the dichloroformate of a gem-bis(4-hydroxyphenyl)alkane having from 1 to 6 carbon atoms in the connective alkylidene radical of said gem-bis(4-hydroxyphenyl) alkane with a substantially equimolar quantity of sodium carbonate.

10. Process for preparing polycarbonate resins which comprises heating at a temperature of from about 90° C. to about 250° C. the dichloroformate of a gem-bis(4-hydroxyphenyl) alkane having from 1 to 6 carbon atoms in the connective alkylidene radical of said gem-bis(4-hydroxyphenyl) alkane with sodium bicarbonate, said sodium bicarbonate being present in a molar quantity about twice that of the dichloroformate of the gem-bis(4-hydroxyphenyl)alkane.

11. Process according to claim 1 wherein the metal salt and aryl dichloroformate are heated in contact with each other in an inert organic solvent medium.

12. Process according to claim 11 wherein there is present a catalytic amount of a tertiary nitrogen base.

13. Process according to claim 1 wherein the bisphenol dichloroformate has the general formula

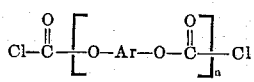

wherein $n$ has a value of from 1 to about 15 and Ar represents a divalent aromatic hydrocarbon radical.

References Cited by the Examiner

UNITED STATES PATENTS

| | | | |
|---|---|---|---|
| 2,964,797 | 12/1960 | Peilstocker et al. | 260—47 |
| 3,030,331 | 4/1962 | Goldberg | 260—47 |
| 3,030,335 | 4/1962 | Goldberg | 260—47 |
| 3,161,615 | 12/1964 | Goldberg | 260—47 X |
| 3,189,640 | 6/1965 | Dietrich et al. | 260—463 |
| 3,213,061 | 10/1965 | Caldwell et al. | 260—47 X |
| 3,220,976 | 11/1965 | Goldberg | 260—47 X |
| 3,223,677 | 12/1965 | Matzner | 260—47 X |

FOREIGN PATENTS

| | | |
|---|---|---|
| 870,096 | 6/1961 | Great Britain. |
| 1,198,715 | 6/1959 | France. |

WILLIAM H. SHORT, *Primary Examiner.*

LOUISE P. QUAST, *Examiner.*

UNITED STATES PATENT OFFICE
CERTIFICATE OF CORRECTION

Patent No. 3,312,660                                      April 4, 1967

Raymond P. Kurkjy et al.

It is hereby certified that error appears in the above numbered patent requiring correction and that the said Letters Patent should read as corrected below.

Column 8, line 44, for "$HCO_3^{--}$" read -- $SO_3^{--}$ --.

Signed and sealed this 14th day of November 1967.

(SEAL)
Attest:

Edward M. Fletcher, Jr.                               EDWARD J. BRENNER
Attesting Officer                                           Commissioner of Patents